Patented May 11, 1926.

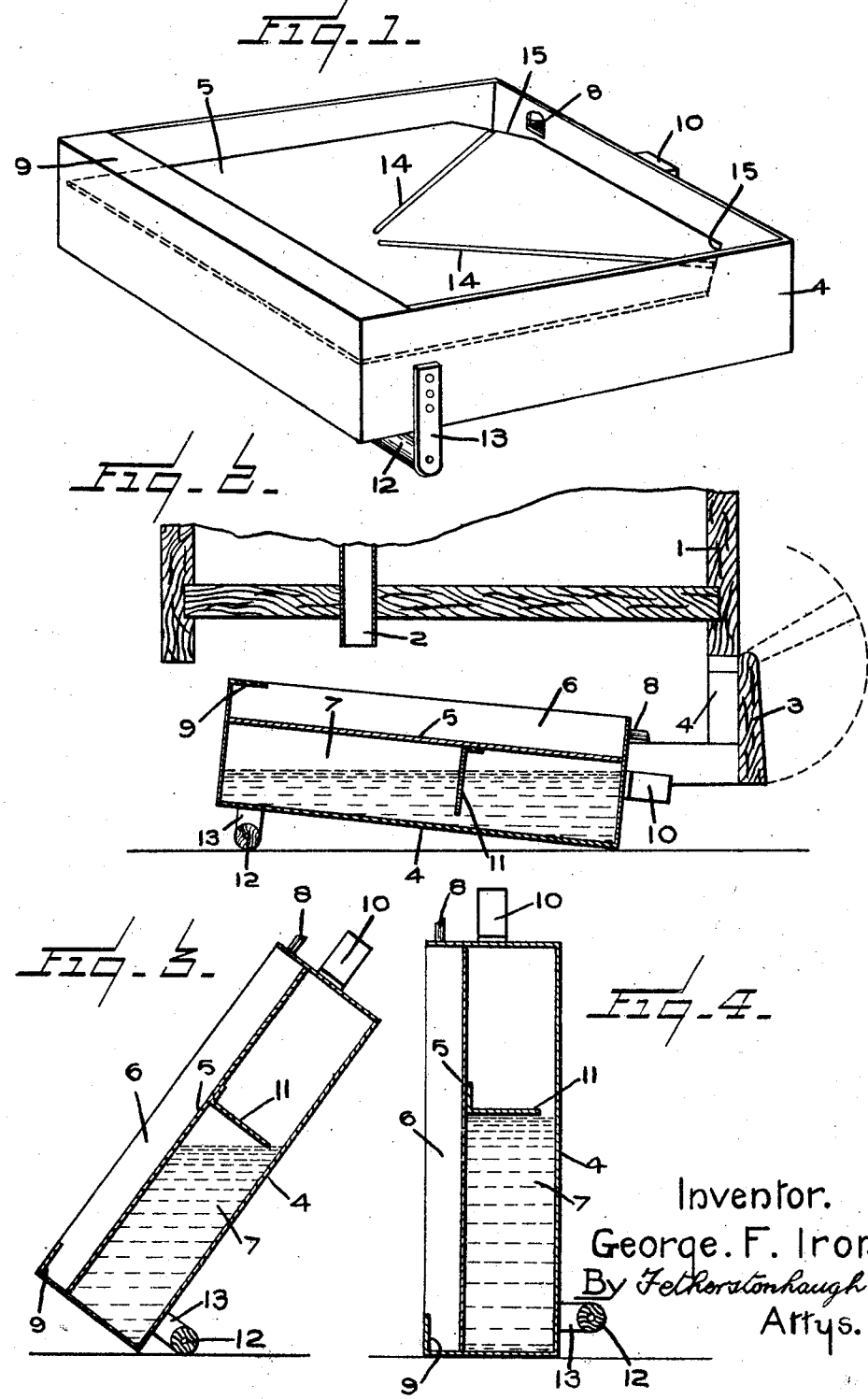

1,584,175

UNITED STATES PATENT OFFICE.

GEORGE FALCONER IRONS, OF REGINA, SASKATCHEWAN, CANADA.

REFRIGERATOR DRIP PAN.

Application filed April 19, 1924. Serial No. 707,647.

My invention relates to improvements in refrigerator drip pans and the object of the invention is to devise a pan which can be readily inserted under the refrigerator and removed therefrom for the purpose of catching the drip from the waste pipe of the ice chamber of the refrigerator.

A further object is to devise means for tilting the pan so that the water dropping onto the partition therein will run down into the water container.

A still further object is to devise means for catching any condensation or water on the partition and preventing the same dripping onto the floor when the pan is raised into the carrying position.

My invention consists of a pan constructed and arranged all as hereinafter more particularly described and illustrated in the accompanying drawing in which:

Fig. 1 represents a perspective view of a pan constructed according to my invention.

Fig. 2 is a vertical section through the bottom portion of a refrigerator showing the waste pipe and my pan positioned thereunder.

Fig. 3 is a vertical section through the pan showing the same in the partially raised position, and Fig. 4 is a similar view to Figure 3 showing the pan in the carrying position.

Like characters of reference indicate corresponding parts in the different views.

1 is the refrigerator. 2 is the waste pipe from the ice chamber. 3 is the usual front flap hinged to the cut-away portion 4 of the refrigerator front. 4 is my drip pan preferably constructed of rectangular shape and provided with the horizontally extending partition 5 positioned intermediately of the height of the interior of the pan so as to divide the pan into the upper portion 6 and the water carrying chamber 7.

8 is an overflow spout provided at one end of the upper portion 6 of the pan and 9 is a turned over lip provided at the opposite end. 10 is the pan handle and 11 is a depending splash guard secured to the underneath side of the partition 5 and its lower edge spaced apart from the bottom of the pan. 12 is a roller journalled in the brackets 13 positioned in the vicinity of the opposite end of the pan to the handle 10.

14 are diverging grooves extending from the vicinity of the centre of the partition 5 to the cut-away corners 15, the cutting away of the corners constituting orifices between the walls of the pan and such cut-away corners 15.

My device is used as follows:

The refrigerator flap 3 is turned up and the pan inserted under the waste pipe 2 wherein such pan will lie in the position illustrated in Figure 2, being tilted downwardly towards the handle end through the medium of the roller 12 which elevates the opposite end. The water from the waste pipe 2 will fall onto the partition 5 in the vicinity of the inner ends of the grooves 14 and flow down said grooves to the cut-away corners, dropping into the water receiving chamber 7.

To remove the pan it is only necessary to pull the same out by the handle 10, elevating the handle end of the pan a small extent so that the pan rolls along on the roller 12. When the pan is clear of the refrigerator it can be swung into the carrying position as illustrated in Figure 4 wherein the water will be contained in the chamber 7 and the pan can then be carried and dumped at any convenient place. The splash guard 11 prevents any of the water splashing up and out of the orifices constituted between the cut-away corners 15 and the walls of the pan.

To empty the pan it is only necessary to turn it up so that the water flows out of one or both of such orifices constituted between the cut-away corners 15 of the partition 5 and the walls of the pan.

When the pan is removed for emptying there will probably be considerable condensation on the top of the partition 5 and possibly a thin film of water. When the pan is upturned into the position illustrated in Figure 4 this condensation or water will run down the partition 5 into the turned over lip 9, thus preventing it dripping onto the floor.

When the pan is filled with water to its full capacity the water will drip out of the spout 8 and thus give warning that the pan is full.

From the above description it will be apparent that I have devised a simple and effective drip pan which can be moved with ease for the purpose of emptying and, moreover, one in which there will be no liability of the water splashing over onto the floor.

Furthermore, I have described my pan as being particularly applicable for use with refrigerators but it could be used for containing any other liquids, such as oil.

What I claim as my invention is.

1. A refrigerator drip pan of substantially rectangular shape having an open top, a horizontal partition in the pan positioned intermediately of the height thereof and having the corners of one end cut away diagonally to constitute orifices between the partition and the walls of the pan, said partition dividing the pan into an upper chamber and a lower water receiving chamber, and means for normally supporting the pan so that the partition tilts downwardly towards the orifices.

2. A refrigerator drip pan having an open top, a horizontal partition in the pan positioned intermediately of the height thereof and dividing the pan into an upper chamber and a lower water receiving chamber, said partition having an orifice therethrough, means for normally supporting the pan so that it tilts downwardly towards one end, and a depending splash guard secured to the bottom of the partition intermediately of its length and its free edge spaced apart from the bottom of the pan.

GEORGE FALCONER IRONS.